(12) United States Patent
Loewel et al.

(10) Patent No.: US 9,723,081 B2
(45) Date of Patent: Aug. 1, 2017

(54) METHOD, A VEHICLE MOUNTABLE CONTROLLER AND A DEVICE FOR OPERATING A VEHICLE MOUNTABLE CONTROLLER IN A COMPUTER NETWORK

(71) Applicant: Alcatel Lucent, Boulogne Billancourt (FR)

(72) Inventors: Thomas Loewel, Stuttgart (DE); Ralph Ballentin, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 16 days.

(21) Appl. No.: 14/387,327

(22) PCT Filed: May 15, 2013

(86) PCT No.: PCT/EP2013/060058
§ 371 (c)(1),
(2) Date: Sep. 23, 2014

(87) PCT Pub. No.: WO2013/189667
PCT Pub. Date: Dec. 27, 2013

(65) Prior Publication Data
US 2015/0112507 A1    Apr. 23, 2015

(30) Foreign Application Priority Data
Jun. 21, 2012    (EP) .................................... 12305706

(51) Int. Cl.
*H04L 29/08*    (2006.01)
*H04W 4/04*    (2009.01)
*G06F 9/50*    (2006.01)

(52) U.S. Cl.
CPC ............ *H04L 67/12* (2013.01); *G06F 9/5072* (2013.01); *H04L 67/125* (2013.01); *H04W 4/046* (2013.01)

(58) Field of Classification Search
USPC .............................................. 701/1
See application file for complete search history.

(56) References Cited

U.S. PATENT DOCUMENTS

| | | | |
|---|---|---|---|
| 6,463,457 | B1 | 10/2002 | Armentrout et al. |
| 2006/0184296 | A1 | 8/2006 | Voeller et al. |
| 2012/0004804 | A1 | 1/2012 | Beams et al. |

FOREIGN PATENT DOCUMENTS

| | | |
|---|---|---|
| CN | 101017438 | 8/2007 |
| JP | 2007087273 | 4/2007 |
| JP | 2007139478 | 6/2007 |
| JP | 2009504104 | 1/2009 |

*Primary Examiner* — Shelley Chen
(74) *Attorney, Agent, or Firm* — Patti & Malvone Law Group, LLC

(57) ABSTRACT

An exemplary technique is provided for operating a vehicle mountable controller that is mounted to a vehicle and used to control at least a part of the vehicle's operation. The vehicle mountable controller may be used as a network element in a computer network. An idle controller resource of the vehicle mountable controller is provided for remote processing to the computer network. The technique includes determining an operating mode of the vehicle in which the vehicle mountable controller is mounted, and performing a test to determine whether to use the vehicle mountable controller as a network element in the computer network based on the operating mode of the vehicle at a time that the test is performed.

20 Claims, 3 Drawing Sheets

METHOD, A VEHICLE MOUNTABLE CONTROLLER AND A DEVICE FOR OPERATING A VEHICLE MOUNTABLE CONTROLLER IN A COMPUTER NETWORK

FIELD OF THE INVENTION

The invention is based on a priority application EP12305706.9 which is hereby incorporated by reference.

The Invention relates to a method, a vehicle mountable controller and a server for operating a vehicle mountable controller in a computer network. The invention also relates to a computer program and a computer program product for operating such a vehicle mountable controller.

BACKGROUND

Vehicles are typically operated by vehicle mountable controllers that are mounted to a vehicle and when in use control at least a part of vehicles operation. Such controllers are for example used to control the engine that drives a vehicle or the brakes that decelerate the vehicle. Furthermore, such controllers are used to operate the in-vehicle navigation or entertainment system and other critical or non-critical functions of a vehicle. The resources of such controllers like processors, storage or memory are typically dimensioned regarding processing speed, clock rate or storage or memory size and access rate for the worst case scenario. A worst case scenario may be a driving situation of the vehicle requiring maximum processing speed and memory or storage. For example, in an emergency braking situation using anti lock braking system of a vehicle the maximum resources of the anti lock brake controller may be used. Likewise when computing a new route for the in-vehicle navigation system the in-vehicle navigation system controller may use maximum processing and storage access time or maximum memory size. In a normal operation of the vehicle, e.g. when cruising while not requiring new route information at least some of the available resource of the controllers, e.g. the in-vehicle navigation controller or brake controller, is unused.

SUMMARY

The object of the invention is thus to make use of the idling resource of the vehicle mountable controllers while they are not used for controlling the vehicle.

The main idea of the invention is to operate a vehicle mountable controller, in particular a controller mounted to a vehicle and when in use controlling at least part of the vehicle's operation as a computer network element in a computer network wherein idle controller resource of the vehicle mountable controller is provided for remote processing to the computer network by
  determining the operating mode of the vehicle the vehicle mountable controller is mounted to, and
  performing a test for determining whether to use the vehicle mountable controller as network element or not depending on the operating mode of the vehicle, in particular at the time the test is performed.

This ensures that the controller resource of the vehicle mountable controller is shared for remote processing with a computer network only when the vehicle that the vehicle mountable controller is mounted to is in a suitable operating mode.

Advantageously, data for remote processing is received, in particular by the vehicle mountable controller, and the result of the remote processing is sent, in particular by the vehicle mountable controller. This way data for remote processing is transferred between a computer network and the vehicle mountable controller.

Advantageously, upon detection of a vehicle shutdown request it is determined whether to request transfer of a snapshot of the data as processed remotely or to request to finish processing before shutting down the vehicle mountable controller. This guarantees that a vehicle shutdown request received for example from the ignition lock of the vehicle does not result in a direct shutdown of the vehicle mountable controller while it is still processing data remotely for the computer network.

Advantageously upon detection of a vehicle shutdown request the transfer of a snapshot of the data as processed remotely is requested before shutting down the vehicle mountable controller. This allows saving already processed data as it is in a snapshot.

Advantageously, upon detection of a vehicle shutdown request it is requested to finish processing the data to be processed remotely before shutting down the vehicle mountable controller. This allows shutting down the vehicle mountable controller after processing of the data is finished.

Advantageously, information about the vehicle mountable controller is sent. This provides additional information about the vehicle mountable controller to the computer network.

Advantageously, the information about the vehicle mountable controller comprises information about idle controller resources of the vehicle mountable controller. This way the vehicle mountable controller's idle resources are available to the computer network.

Advantageously, data is selected from pre-determined data, in particular stored on a database, and selected data is sent for remote processing to the vehicle mountable controller depending on the result of the selection, in particular depending on the size or type of the data and the information about the vehicle mountable controller. This way suitable data for remote processing is selected and sent to the vehicle mountable controller.

Advantageously the result of the test is to use the vehicle mountable controller as network element when the power supply to the vehicle mountable controller is switched on or when the vehicle that the vehicle mountable controller is mounted to is connected to a battery charging device, in particular via a cable at the time the test is performed. This allows selecting suitable operating modes easily.

Advantageously, the operation mode is determined by determining whether the vehicle that the vehicle mountable controller is mounted to is connected to the battery charging device, in particular via the cable, at the time the test is performed. This allows determining the operating mode easily.

Advantageously, a first message for activating the vehicle mountable controller as a network element or a second message for deactivating the vehicle mountable controller as a network element is transmitted. This way the vehicle mountable controller can be activated or deactivated from the computer network remotely. The invention also concerns a vehicle mountable controller for controlling at least part of a vehicle's operation when mounted to a vehicle operable as computer network element in a computer network for providing idle controller resource of the vehicle mountable controller for remote processing to the computer network, wherein the vehicle mountable controller is operable to
  determine the operating mode of the vehicle the vehicle mountable controller is mounted to, and perform a test for determining whether to use the vehicle mountable controller as a network element or not, depending on the operating mode of the vehicle, in particular, at the time the test is performed.

Furthermore, the invention relates to a device for managing a vehicle mountable controller, in particular, a controller mounted to a vehicle and when in use controlling at least part of the vehicle's operation as a computer network element in a computer network, operable to determine the operating mode of the vehicle the vehicle mountable controller is mounted to perform a test for determining, whether to use the vehicle mountable controller as a network element or not, depending on the operating mode of the vehicle, in particular, at the time the test is performed determine idle controller resource of the vehicle mountable controller provided for remote processing to the computer network select data from pre-determined data, in particular, stored in a database and send the selected data for remote processing to the vehicle mountable controller, depending on the result of the test, in particular, depending on size or type of the data and the information about the vehicle mountable controller.

Further developments of the invention can be gathered from the dependent claims and the following description.

BRIEF DESCRIPTION OF THE FIGURES

In the following the invention will be explained further making reference to the attached drawings.

DESCRIPTION OF THE EMBODIMENTS

Figure 1:
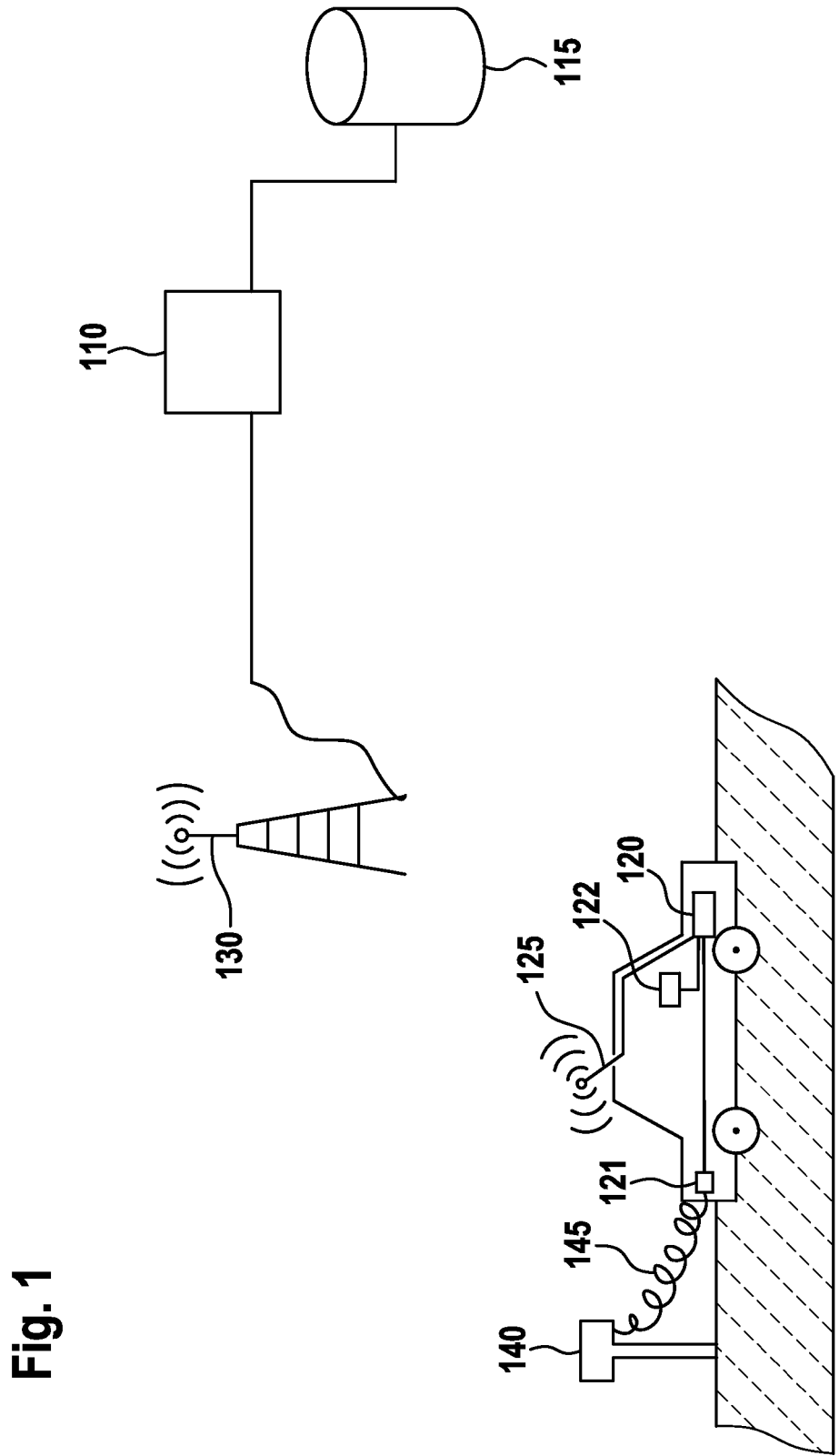
FIG. 1 schematically shows part of a computer network.

FIG. 1 shows a part of a computer network. According to a first embodiment of the invention, the computer network comprises a central server 110 for managing a vehicle mountable controller. The central server 110 is connected to a database 115 via a data link. Furthermore, the central server 110 is connected to a first transceiver 130 via a data link. The data links between the central server 110 and the database 115 or the first transceiver 130 may be direct data links or links via multiple nodes of a computer network. The central server 110, the database 115 and the first transceiver 130 may be part of a computer network according to the internet protocol multimedia subsystem well known as IMS. Such computer networks are well known to the person skilled in the art and not further described here.

The computer network comprises at least temporarily one or more vehicle mountable controllers 120 that are connectable to the computer network via a second transceiver 125. The connection to the computer network is made for example between the second transceiver 125 and the first transceiver 130. The connection is for example a wireless connection according to the long term evolution standard well known as LTE or the IEEE802.11 standard.

The vehicle mountable controller 120 is adapted to control at least part of the operation of a vehicle that the vehicle mountable controller 120 is mounted to. This means that the controller mounted to the vehicle when in use controls at least a part of the vehicle's operation, for example, the engine the brakes of the vehicle or the in-vehicle navigation system.

Preferably the vehicle is an electric vehicle operated by a battery and driven by an electrical engine. In this case the vehicle mountable controller 120 is adapted to when in use control at least part of the operation of the electrical vehicle.

Furthermore, the vehicle mountable controller 120 is operable as a computer network element in a computer network for providing idle controller resource of the vehicle mountable controller 120 for remote processing of data to the computer network. This means that the vehicle mountable controller 120 is operable to execute instructions to perform operations on data like any other computer network element of a computer network. To that end, the instructions may be preinstalled on the vehicle mountable controller 120 for example in the storage of the vehicle mountable controller 120. Alternatively, the vehicle mountable controller 120 may be adapted to receive the instructions and data for remote processing. In any case the vehicle mountable controller 120 may be adapted to operate only a certain type or size of data. The size or type of data that can be processed by the vehicle mountable controller 120 remotely may be predetermined and stored on the storage of the vehicle mountable controller 120, e.g. in a list.

The vehicle mountable controller 120 is adapted to determine the idle time or the size of free memory or storage available on the vehicle mountable controller. The idle time in this context is the processing time or cycle time that the vehicle mountable controller 120 does not use for controlling the vehicle that the vehicle mountable controller is mounted to. Method for determining idle time or the size of free memory or storage available and size or type of the data that can be processed are well known to the person skilled in the art and not further explained here.

Furthermore the vehicle mountable controller 120 is adapted to determine information about the operating mode of the vehicle the vehicle mountable controller 120 is mounted to.

For example, the vehicle mountable controller 120 is adapted to monitor an ignition lock 122 and determine whether the ignition lock is in a locked or unlocked position. To that end the vehicle mountable controller 120 is connectable according to the example to the ignition lock 122 of the vehicle for performing the test to determine the information about the operating mode of the vehicle the vehicle mountable controller is mounted to.

Alternatively or additionally the vehicle mountable controller 120 may be adapted to be connected to any other vehicle mountable controller of the same vehicle and receive information about the vehicle's operating mode. For example when the vehicle mountable controller 120 is part of the in-vehicle navigation system, it may be connected to the engine controller of the same vehicle and receive information about whether the engine is running or not in order to determine the information about the operating mode of the vehicle.

Additionally or alternatively, in case of an electric vehicle the vehicle mountable controller 120 may be adapted to monitor plug 121, to determine whether the electrical vehicle is plugged into a battery charging device 140, in particular via a cable 145, as depicted in FIG. 1. To that end the vehicle mountable controller 120 may be connectable to the plug 121 for testing whether the cable 145 is plugged into the plug 121 or power is transferred via the cable 145 or not. In this case the vehicle mountable controller 120 may be adapted to determine the information about the operating mode of the electrical vehicle the vehicle mountable controller is connected to depending on the result of this test. The plug 121 or the connection to the plug 121 is optional.

The vehicle mountable controller 120 may only be adapted to be connected to the plug 121 when the vehicle mountable controller is manufactured to be installed in electrical vehicles.

The information about the vehicle's operating mode is determined for example as state of the ignition lock 122: "ON", "ACC", "LOCK". Alternatively or additionally the information about the vehicle's operating mode may be determined as charging state: "ON", "OFF". The charging state for example indicates "ON" when the cable 145 is plugged into the electrical vehicle's plug 121 and "OFF" otherwise. To that end for example electrical signals are evaluated. Methods to translate the electrical signals into the information for determining the operation mode of the vehicle are well known to the person skilled in the art and not further explained here.

In case information about the operating mode is received from another controller of the same vehicle for example messages may be exchanged between the vehicle mountable controller 120 and the other controller via a controller area network, well known as CAN. Methods for exchanging information about the operating mode between vehicles are also well known.

According to the first embodiment, the vehicle mountable controller 120 is adapted to send the information about the vehicle mountable controller 120 and the information about the operating mode of the vehicle the vehicle mountable controller 120 is mounted to. For example the available idle time or size of free memory or storage available and the state of the ignition lock or the charging state is sent to the central server 110 via the data link.

Furthermore the central server 110 is adapted receive the information about the operating mode and to determine the operating mode of the vehicle the vehicle mountable controller 120 is mounted to from the information about the operating mode received.

For example the vehicle's operating mode is determined as "ON" in case the ignition lock 122 has the state "ON" or "ACC". For example the vehicle's operating mode is determined as "OFF" in case the ignition lock 122 has the state "OFF".

Alternatively or additionally the operation mode may be determined as "ON" when the charging state is "ON" and the operating mode may be determined as "OFF" otherwise. In case of using both, the information about the plug 121 and the ignition lock 122, the vehicle's operation mode may be determined as "ON" regardless of the state of the ignition lock 122 whenever the charging state indicates "ON".

The central server 110 is adapted receive the information about the vehicle mountable controller 120 and to determine the size or type of data, for example, depending on the idle time or the size of free memory or storage available. Furthermore the central server 110 may be adapted to determine whether to send instructions for processing the data remotely or not as well, depending on the information about the vehicle mountable controller 120.

Furthermore, the central server 110 may be adapted to determine idle controller resources of the vehicle mountable controller provided for remote processing to the computer network. The idle controller resource is determined for example from the information received from the vehicle mountable controller 120 via the first transceiver 130. For example information about the available resources of the vehicle mountable controller 120 is stored in the data base 115 and the currently used processing time, memory or storage is received as information. In this case the difference between used and available is used to determine the idle controller resources.

Furthermore the central server 110 is adapted to determine whether to use the vehicle mountable controller 120 as a network element or not depending on the information about the vehicle mountable controller 120. For example the vehicle mountable controller 120 is used as network element in case it is determined that data is available that can be processed using the idle time or size of free memory or storage available.

To that end the central server 110 is adapted to perform a test for determining whether to use the vehicle mountable controller 120 as a network element or not, depending on the operating mode of the vehicle, in particular the operating mode the vehicle is in at this time the test is performed. For example, the result of the test is to use the vehicle mountable controller 120 as a network element when the operating mode of the vehicle is "ON".

This means that the central server 110 is adapted to decide whether the operating mode of the vehicle mountable controller 120 is suitable for using a vehicle mountable controller 120 as a network element. For example, the vehicle mountable controller may be used as a network element, in case the network operating mode indicates that the vehicle the vehicle mountable controller is mounted to is connected to the battery charging device 140 via the battery charging cable 145 this way.

Furthermore, the central server 110 is adapted to select data from pre-determined data, in particular from data stored on the database 115 and send the selected data for remote processing to vehicle mountable controller 120 depending on the result of the test, in particular depending on size or type of the data and the information about the vehicle mountable controller 120 received. For example, the central server 110 selects the data from the pre-determined data by a lookup in a table stored in the central server 110 or the database 115 that maps pre-determined data available on the database 115 to idle controller resources or operating modes suitable depending on the size or type of the data, and the information about vehicle mountable controller like idle time or operating mode of the vehicle. For example, only data that can be processed with little idle time quickly is sent to be processed remotely on the vehicle mountable controller 120 in case the vehicle that the vehicle mountable controller 120 is mounted to is in a normal operating mode. For example, larger pieces of data requiring more idle time and a longer presence processing time is sent to the vehicle mounted controller 120 in case the vehicle is plugged to the battery charging device 140 via the cable 145. Likewise no data is sent in case the operating mode of the vehicle is "OFF" or the available resources are less than required to process the data remotely.

Alternatively or additionally, the vehicle mountable controller 120 may be adapted to perform another test for determining whether to use the vehicle mountable controller 120 as a network element or not, depending on the operating mode of the vehicle, in particular the operating mode the vehicle is in at this time the test is performed. For example, the result of the test is to use the vehicle mountable controller 120 as a network element when the operating mode of the vehicle is "ON". In this case the vehicle mountable controller 120 may be adapted to accept requests for remote processing depending on the result of this other test, i.e. to accept requests when the result indicates that the operating mode of the vehicle is "ON" only and to reject requests otherwise.

To that end the vehicle mountable controller 120 may be adapted to determine the operating mode of the vehicle the vehicle mountable controller 120 is mounted to from the information about the operating mode.

Additionally or alternatively, in case of an electric vehicle the vehicle mountable controller 120 may be adapted to determine the operating mode of the electrical vehicle the vehicle mountable controller is connected to depending on the result of the test.

For example the vehicle's operating mode is determined as "ON" in case the ignition lock 122 has the state "ON" or "ACC". For example the vehicle's operating mode is determined as "OFF" in case the ignition lock 122 has the state "OFF". Alternatively or additionally the operation mode may be determined as "ON" in case it is determined that the cable 145 is plugged into the vehicle's plug 121 and "OFF" otherwise. In the case of using the information about the plug 121 and the ignition lock 122, the vehicle's operation mode may be determined as "ON" regardless of the state of the ignition lock 122 whenever it is determined that the cable 145 is plugged into the vehicle's plug 121.

In this case, the operating mode may be sent to the central server 110 additionally to or instead of the information about the operating mode. In the first case the central server 110 may be adapted to use the operating mode information to validate the information about the operating mode received. In the latter case the operating mode may not be determined at the central server 110 but only the received operating mode may be used to determine whether to use the vehicle mountable controller 120 as network element or not.

Furthermore, the central server 110 may be adapted to transmit a first message 200 for activating the vehicle mountable controller 120 as a network element or to transmit a second message 211 for deactivating the vehicle mountable controller 120 as a network element.

Figure 2:
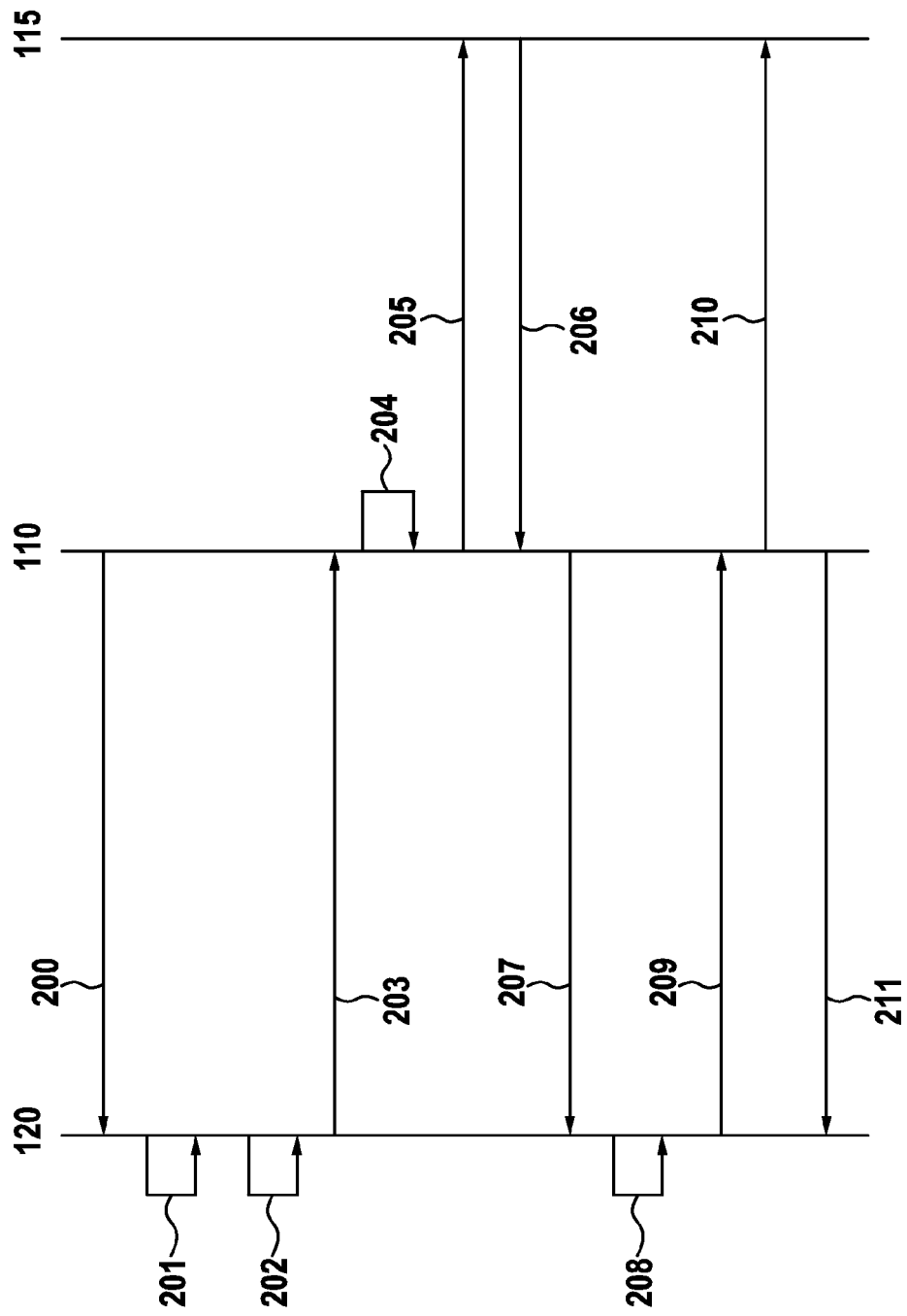
FIG. 2 schematically shows a first sequence diagram.

The first and second message and the other messages used in a method according to the first embodiment are explained below, making reference to sequence diagram of FIG. 2.

The method according to the first embodiment starts for example upon detection of an ignition "ON" or "ACC" of the ignition lock 122 by the vehicle mountable controller 120 and after the vehicle mountable controller 120 has successfully established a connection with the central server 110 via the first transceiver 130 and the second transceiver 125.

Both the central server 110 and the vehicle mountable controller 120 comprise instructions that allow sending and receiving of messages via the transceivers and implements the steps of the method. These instructions are for example stored as computer program or executable code in storage of the respective server or controller and comprise instructions to set up a data link between the two. This way the vehicle mountable controller 120 is for example adapted to request a connection to the central server 110 via an Internet Protocol Multimedia subsystem link using an Internet Protocol address of the central server 110 that is permanently stored in the vehicle mountable controller 120. Furthermore the central server 110 is adapted to accept connection requests from and establish a connection to the vehicle mountable controller 120 using an Internet Protocol address of the vehicle mountable controller 120 that is either received in the connection request or stored on the central server 110.

After the start, the first message 200, for activating the vehicle mountable controller 120 as a network element is sent from the central server 110 to the vehicle mountable controller 120 via the respective transceivers 125 and 130.

Afterwards, in a step 201 the vehicle mountable controller 120 determines the information about the operating mode of the vehicle the vehicle mountable controller is mounted to. For example, the vehicle mountable controller determines the operating mode by monitoring the ignition locks 122 or the plug 121.

The information about the operating mode is, for example, the state of the ignition lock 122: "ON", "ACC", "LOCK" or the charging state "ON" or "OFF" as described above.

Afterwards in a step 202 the vehicle mountable controller 120 determines the operating mode of the vehicle. Furthermore the vehicle mountable controller 120 performs the test for determining whether to use the vehicle mountable controller 120 as a network element or not. The test is performed depending on the operating mode of the vehicle in particular depending on the operating mode of the vehicle at the time the test is performed. For example, the vehicle mountable controller 120 can be used as a network element in case the operating mode is "ON". Furthermore, the vehicle mountable controller 120 may not be used as a network element in case the operating mode is "OFF".

After the test information about the vehicle mountable controller 120 is sent as a response 203 from the vehicle mountable controller 120 to the central server 110. For example, the information about the vehicle mountable controller 120 comprises information about idle computer resources of the vehicle mountable controller 120. Idle controller resources in this context may be idle processing time or available memory or storage as described above.

Upon receipt of the response 203 the central server 110 determines in a step 204 what data to use on the vehicle mountable controller 120 for remote processing. For example the data to use is selected from pre-determined data depending on the available idle resource size of the data and operating mode of the vehicle mountable controller 120. For example, the central server 110 looks up the data to use in the table of pre-determined data by selecting suitable data for the available idle resources. Upon selection of the data the central server 110 sends a request 205 to the data base 115. Upon receipt of the request for data, the database 115 returns the requested data in a response 206.

Upon receipt of the data in the response 206, the central server 110 sends the received data in a message 207 to the vehicle mountable controller 120.

Upon receipt of the data in the message 207, the vehicle mountable controller 120 processes the data remotely in a step 208.

Upon completion of the processing the vehicle mountable controller 120 sends the result of the processing to the central server 110 in a message 209.

Upon receipt of the result in the message 209 the central server 110 sends the result to the database 115 in a request for storage 210. The database 115 stores the result upon receipt of the request to store in message 210.

Furthermore, the central server 110 upon receipt of the result in message 209 sends the second message 211 for deactivating the vehicle mountable controller as a network element to the vehicle mountable controller 120.

Afterwards the method ends. Alternatively the method continues for example in case additional data is available for processing by repeating the aforementioned steps.

The method is described above with the vehicle mountable controller 120 performing the steps necessary to determine the operating mode. The method may be modified to have the central server 110 perform these steps by interchanging the order of executing step 202 and sending message 203 and sending the information about the operating mode instead of sending the operating mode from the vehicle mountable controller 120 to the central server 110 in message 203.

Figure 3:
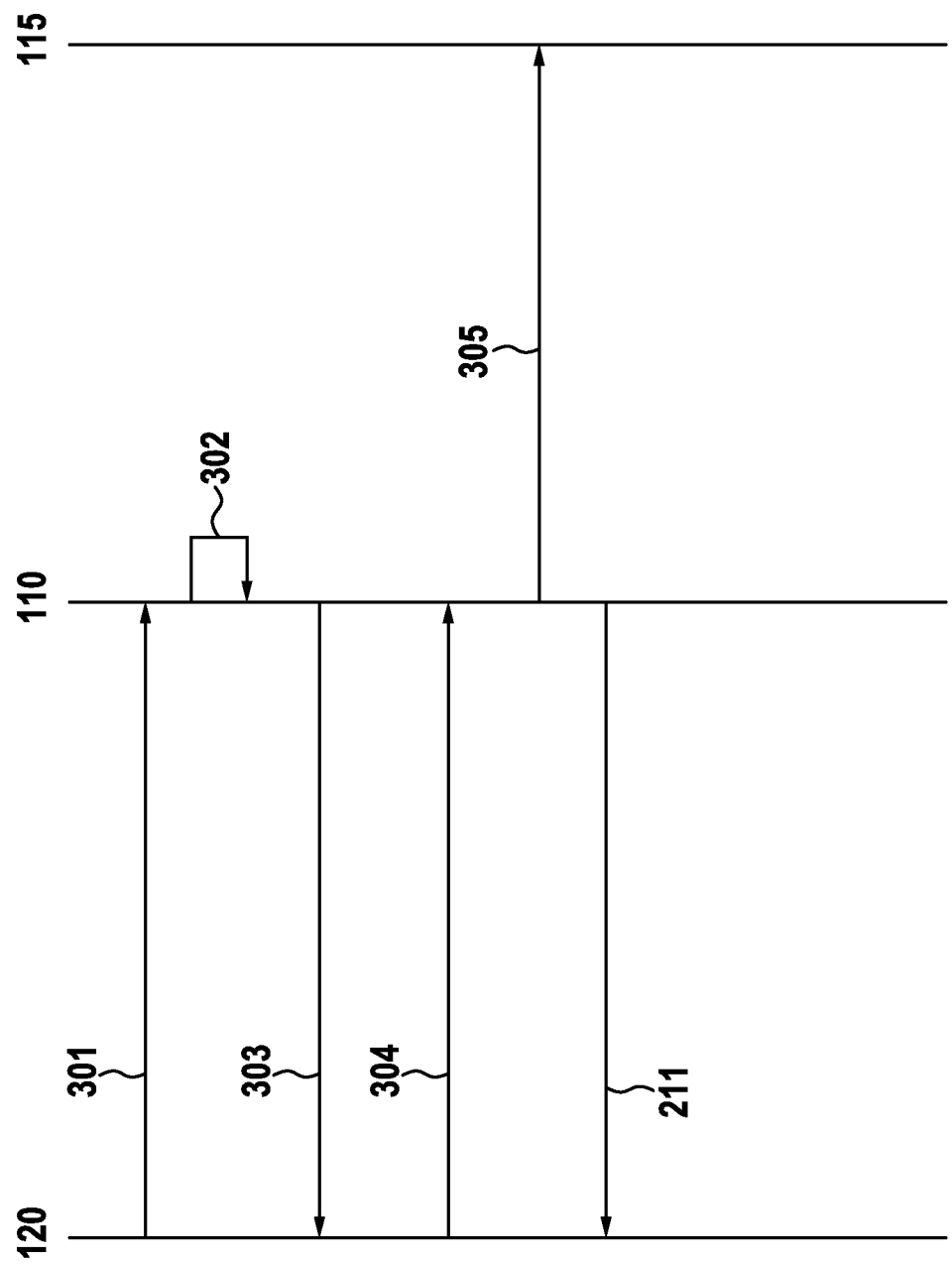
FIG. 3 schematically shows a second sequence diagram.

An addition to the method in particular for interrupt handling is explained, making reference to FIG. 3.

The interrupt handling is started, for example, whenever the vehicle mountable controller 120 determines a significant change in the operating mode of the vehicle. For example when the ignition lock 122 is turned changing the ignition lock state from "ON" or "ACC" position to the "OFF" position, indicating that a user of the vehicle wants to shut down the vehicle.

Optionally in case of an electrical vehicle the interrupt handling is started, for example, whenever the charging state changes from "ON" to "OFF" indicating that the electrical vehicle has been disconnected from the battery charging device 140 by unplugging the cable 145 from the plug 121.

Depending on whether the vehicle mountable controller 120 or the central server 110 determines the operating mode, the interrupt handling is started either by transferring the new operating mode to the central server 110 or by transferring the new information about the operating mode to the central server 110. In the first case the vehicle mountable controller 120 determines the new operating mode from the new information about the operating mode as described above for the operating mode and sends the operating mode to the central server 110. In the latter case the central server 110 determines the operating mode from the new information about the operating mode received from the vehicle mountable controller 120 as described above.

Upon receipt of a message 301 indicating aforementioned new operating mode or containing aforementioned new information about the operating mode, a step 302 is executed.

In step 302 it is determined if the operating mode changed, in particular from the "ON" to the "OFF" mode, i.e. indicating a vehicle shutdown request. Furthermore the central server 110 determines whether to request to transfer a snapshot of the data as processed remotely, or to finish processing before shutting down the vehicle mountable controller 120.

The result of the determination is sent to the vehicle mountable controller 120 in a message 303.

For example, the message 303 contains an instruction, e.g. a string "snapshot" or "final result".

Upon receipt of the message 303 containing the result, the vehicle mountable controller 120 either processes the data remotely before shutting down the vehicle mountable controller or determines the snapshot the data as processed remotely up to the time of receiving the request in message 303. In both cases the vehicle mountable controller 120 sends the requested data that is either the snapshot of the data as processed or the result of the processing after finishing the processing before shutting down the vehicle mountable controller 120 in a message 304 to the central server 110.

For example, the vehicle mountable controller 120 is adapted to interpret the message 303 containing the instruction, e.g. the string "snapshot" or "final result" and process the data accordingly. Furthermore the vehicle mountable controller 120 is adapted to delay the shutdown of the vehicle mountable controller 120 until the processing is finished or the snapshot is transferred successfully. To that end the vehicle mountable controller 120 may comprise of a separate battery, a capacitor or a direct connection to the vehicle's battery to maintain power and switch off only after a confirmation of the successful data transfer to the central server 110 is received.

Upon receipt of the snapshot or the result in message 304 the central server 110 sends the data in a request for storage 305 to the database 115. This ensures that the interrupt does not result in data loss. Furthermore, the central server 110 sends the second message 211 to deactivate the vehicle mountable controller 120 upon receipt of the result or the snapshot in message 304. This prevents shutting down of the vehicle mountable controller 120 before the data has been saved upon detection of the interrupt. To that end, the vehicle mountable controller 120 may be adapted to wait for the second message before the deactivating the vehicle mountable controller 120 as a network element and to shut down.

According to a second embodiment some of the functions performed by the central server 110 in the first embodiment are distributed throughout the computer network. In particular, the functions of the central server 110 of the first embodiment may be performed like in a peer to peer network connecting vehicle mountable controllers mounted to the same or different vehicles and sharing the resources that are idle on the individual vehicle mountable controllers 120 in order to process data. In this scenario the database 115 may be a distributed database, being located on one or more of the vehicle mountable controllers 120 as well. In this case the central server 110 of FIG. 1 as well as the database 115 are distributed throughout the computer network on various vehicles. Furthermore, all steps of the methods described above in the first embodiment are sent not from one vehicle mountable controller 120 to the central server 110, but from one of the vehicle mountable controllers 120 to another vehicle mountable controller 120 of the same computer network. Tracking of the individual vehicle mountable controllers 120 in the second embodiment may either be via a static list, e.g. a list of Internet Protocol addresses, of participating vehicle mountable controllers 120 or via a distributed system that provides a lookup service like a tracker or similar to a distributed hash table of a peer to peer network.

According to the second embodiment the vehicle mountable controllers 120 comprise instructions and hardware that allow performing at least parts of the tasks of the central server 110 or database 115 as described in the first embodiment.

The invention is not limited to a particular way of determining the operating mode of the vehicles involved. Particularly, monitoring of the ignition lock 122 or the plug 121 are just examples of how to determine the operating mode of the vehicle. Any other way of determining the operating mode, for example by accessing or monitoring the other controllers of the vehicle via the controller area network may be used as well.

Furthermore, the type and size of data is not limited to any specific size or type according to the invention. The data that is transferred to the vehicle mountable controllers 120 may be a program code containing instructions together with data to be processed or only the data. In this case the vehicle mountable controllers 120 may comprise of pre-installed program code usable for remotely processing the data.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any sequence diagrams represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for operating a vehicle mountable controller that is mounted to a vehicle and used in a computer network to control at least a part of the vehicle's operation, comprising:
   determining, at a server in the computer network, an operating mode of the vehicle in which the vehicle mountable controller is mounted, wherein the server is located separate from the vehicle, and wherein the server exchanges messages and data wirelessly with the vehicle mountable controller to determine the operating mode and to control at least part of the vehicle mountable controller's operation; and
   performing, at the server, a test to determine whether to use the vehicle mountable controller as a network element in the computer network based on the operating mode of the vehicle at a time that the test is performed.

2. The method according to claim 1, further comprising:
   sending, at the server, data for remote processing to the vehicle mountable controller; and
   receiving, at the server, a result of the remote processing from the vehicle mountable controller.

3. The method according to claim 2, further comprising:
   determining, at the server, whether to request a transfer of a snapshot of the data as processed remotely or to finish processing before shutting down the vehicle mountable controller upon detection of a vehicle shut down request.

4. The method according to claim 3 further comprising:
   requesting, at the server, a transfer of a snapshot of the data as processed remotely before shutting down the vehicle mountable controller upon detection of the vehicle shut down request.

5. The method according to claim 3 further comprising:
   receiving, at the server, a request to finish the remote processing of the data before shutting down the vehicle mountable controller upon detection of the vehicle shut down request.

6. The method according to claim 1 further comprising:
   receiving, at the server, information about the vehicle mountable controller from the vehicle mountable controller.

7. The method according to claim 6 wherein the information about the vehicle mountable controller comprises information about idle controller resources of the vehicle mountable controller.

8. The method according to claim 1 further comprising:
   selecting, at the server, data from predetermined data stored in a database; and
   sending, at the server, the selected data for remote processing to the vehicle mountable controller based on a result of the selection.

9. The method according to claim 1, wherein a result of the test is to use the vehicle mountable controller as the network element when a power supply to the vehicle mountable controller is switched on or when the vehicle that the vehicle mountable controller is mounted to is connected to a battery charging device at the time the test is performed.

10. The method according to claim 9, wherein the operation mode is determined by determining, at the server, whether the vehicle that the vehicle mountable controller is mounted to is connected to the battery charging device at the time the test is performed.

11. The method according to claim 1, further comprising:
    transmitting, at the server, a first message to activate the vehicle mountable controller as the network element; or
    transmitting, at the server, a second message to deactivate the vehicle mountable controller as the network element.

12. A vehicle mountable controller adapted to control at least part of a vehicle's operation when mounted to a vehicle, and adaptable as a network element in a computer network to provide idle controller resource of the vehicle mountable controller for remote processing to the computer network, wherein the vehicle mountable controller is adapted to
    determine an operating mode of the vehicle in which the vehicle mountable controller is mounted, wherein the vehicle mountable controller is adapted to exchange messages and data wirelessly with a server located separate from the vehicle in the computer network to determine the operating mode and to control at least part of the vehicle mountable controller's operation; and perform a test to determine whether to use the vehicle mountable controller as the network element in the computer network based on the operating mode of the vehicle at a time that the test is performed.

13. A device adapted to manage a vehicle mountable controller used in a computer network to control at least a part of the vehicle's operation, the device being adapted to
determine an operating mode of the vehicle in which the vehicle mountable controller is mounted, wherein the device is located separate from the vehicle, and wherein the device is adapted to exchange messages and data wirelessly with the vehicle mountable controller to determine the operating mode and to control at least part of the vehicle mountable controller's operation;
perform a test to determine whether to use the vehicle mountable controller as a network element in the computer network based on the operating mode of the vehicle at a time that the test is performed;
determine an idle controller resource of the vehicle mountable controller provided for remote processing to the computer network;
select data from predetermined data stored on a database; and
send the selected data for remote processing to the vehicle mountable controller based on a result of the test.

14. A non-transitory computer-readable medium having computer executable instructions, said computer-readable medium being implemented within a server adapted to interact with a vehicle mountable controller that is mounted to a vehicle and used in a computer network to control at least a part of the vehicle's operation, comprising:
determining, at the server, an operating mode of the vehicle in which the vehicle mountable controller is mounted, wherein the server is located separate from the vehicle, and wherein the server exchanges messages and data wirelessly with the vehicle mountable controller to determine the operating mode and to control at least part of the vehicle mountable controller's operation; and
performing, at the server, a test to determine whether to use the vehicle mountable controller as a network element in the computer network based on the operating mode of the vehicle at a time that the test is performed.

15. The vehicle mountable controller according to claim 12, wherein the vehicle mountable controller is adapted to control an engine, brakes, or an in-vehicle navigation system of the vehicle.

16. The method according to claim 1, wherein the vehicle mountable controller provides idle controller resource to the computer network for remote processing.

17. The method according to claim 1, wherein the vehicle is an electric vehicle operated by a battery and driven by an electrical engine.

18. The method according to claim 17, wherein the operating mode of the vehicle is determined as a state of an ignition lock of the vehicle or a charging state of the vehicle.

19. The method according to claim 1, wherein the server exchanges the messages and the data wirelessly with the vehicle mountable controller via a wireless connection according to a long term evolution (LTE) standard or an IEEE 802.11 standard.

20. The method according to claim 1, further comprising accepting, at the server, connection requests from the vehicle mountable controller using an Internet Protocol address of the vehicle mountable controller that is either received in a connection request or stored on the server.

* * * * *